Aug. 10, 1965 A. J. BIGGS ETAL 3,200,193
COMPENSATOR FOR COLOR-TELEVISION RECEIVERS FOR CHROMATICITY VARIATIONS IN AMBIENT LIGHT
Filed Aug. 30, 1961
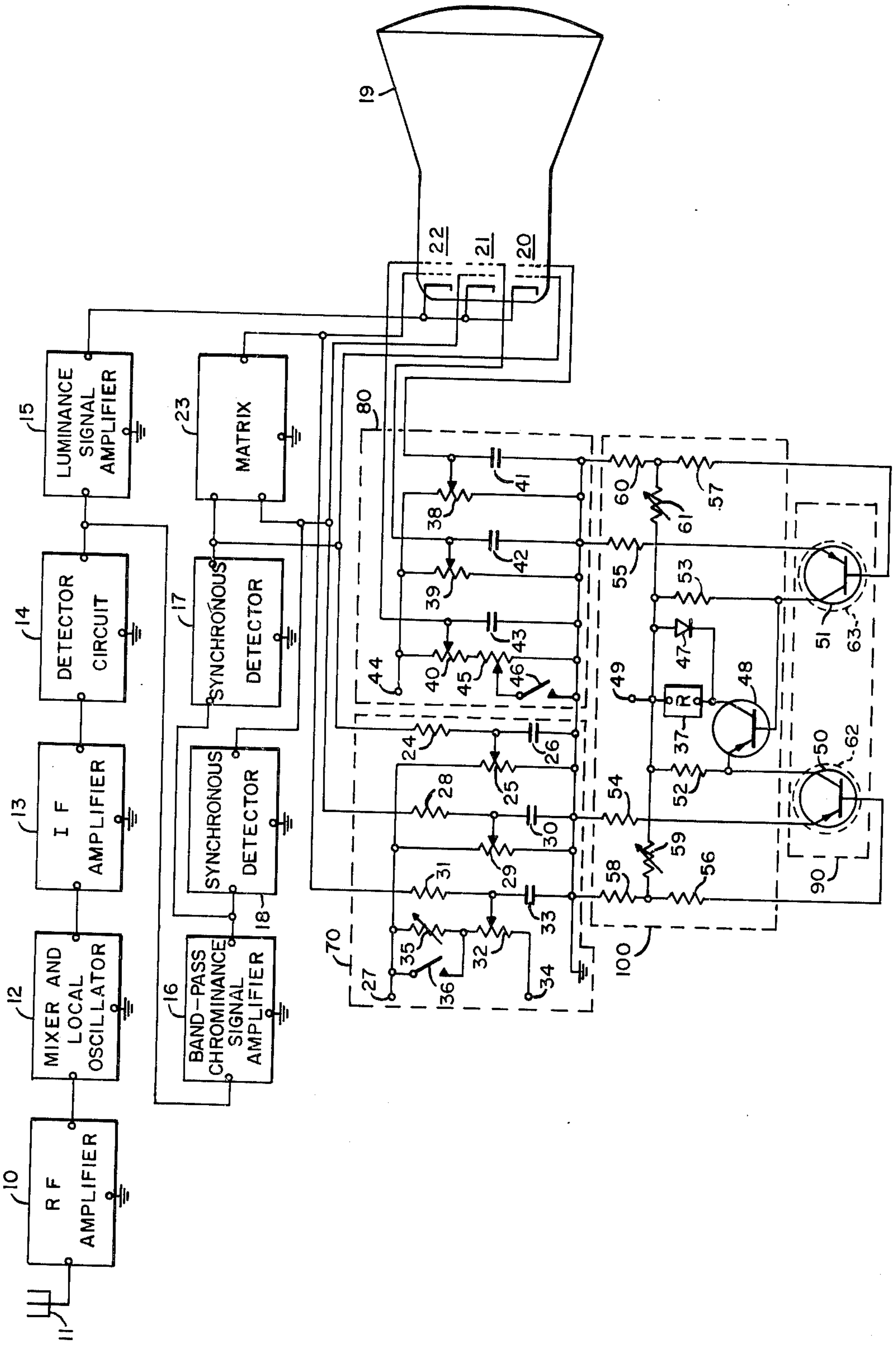

3,200,193

COMPENSATOR FOR COLOR-TELEVISION RECEIVERS FOR CHROMATICITY VARIATIONS IN AMBIENT LIGHT

Albert J. Biggs, Harrow, and George B. Townsend, Little Chalfont, England, assignors to Hazeltine Research, Inc., Chicago, Ill., a corporation of Delaware Filed Aug. 30, 1961, Ser. No. 134,915
Claims priority, application Great Britain, Dec. 8, 1960, 42,298/60
5 Claims. (Cl. 178—5.4)

This invention relates to color-television receivers and particularly to such receivers having apparatus for varying the luminance and chromaticity of the reproduced image for different conditions of ambient light falling on an image reproducing device.

The subjective impression which a viewer receives of a picture reproduced by a color-television receiver is dependent upon the chromaticity of the ambient light falling on the screen of the image reproducing device. It may, therefore, be desirable for the overall chromaticity and luminance of the reproduced image to be different under different conditions of ambient illumination of the screen of the image reproducing device.

In accordance with the present invention a color-television receiver having apparatus to compensate for changes in the ambient light which affect the subjective impression a viewer has of the reproduced image comprises an image reproducing device and means for developing a luminance signal and a chrominance signal from a received composite color-television signal and for supplying these signals to the image reproducing device. The invention also includes means for detecting changes in the ambient light falling on the image reproducing device and means responsive to the detection means for changing a color characteristic of the reproduced image in accordance with the changes in the ambient light to compensate for such changes.

For a better understanding of the present invention, together with other and further objects thereof, reference is had to the following description, taken in connection with the accompanying drawing, and its scope will be pointed out in the appended claims.

Referring to the drawing there is shown a color-television receiver constructed in accordance with the present invention and having apparatus for varying the chromaticity and luminance of the reproduced image for different conditions of ambient light.

*Description and operation*

Referring to the drawing the color-television receiver includes an image reproducing device 19, for example of the tetrode type, having three electron guns 20, 21 and 22.

The color-television receiver also includes means for developing a luminance signal and a chrominance signal from a received composite television signal and for supplying these signals to the image reproducing device 19. This means may include a radio-frequency amplifier 10 for amplifying the received composite television signal fed to it from an antenna 11, and a mixer and oscillator 12 in which the frequency of the main television carrier is converted to an intermediate frequency. The television signal is then fed via an intermediate-frequency amplifier 13 to a detector circuit 14 which is effective to remove the video and subcarrier frequency components from the intermediate-frequency signal and supply these components which constitutes a composite color signal including luminance and chrominance signals to the luminance signal amplifier 15 and the bandpass chrominance signal amplifier 16 respectively. The output of the bandpass amplifier 16 is fed to a pair of synchronous detectors 17 and 18 where red and green color difference signals are respectively detected in a known manner by the application of appropriate phases of a locally generated reference oscillation. A sound reproducing channel (not shown) is also ordinarily coupled to the output of the intermediate-frequency amplifier for developing audible sound signals. The outputs of the synchronous detectors 17 and 18 are fed to a matrixing circuit 23 which produces a blue color difference signal.

The output of the luminance signal amplifier 15 is fed to the cathodes of the three electron guns 20, 21 and 22 so as to produce a monochrome picture on the screen of the image reproducing device 19. The three color difference signals, the two developed by the synchronous detector 17 and 18 and the one developed by the matrix 23, are fed to the control grids of the electron guns 20, 21 and 22 thereby adding color information to the monochrome picture.

The color-television receiver may additionally include means for biasing the image reproducing device to develop a reproduced image of desired chromaticity and luminance. This means includes the bias network 70, shown within dotted lines, and the bias network 80 also shown within dotted lines. A bias potential positive with respect to ground is applied to the control grid of the red electron gun 20 by means of a network comprising a resistor 24 connected between the control grid of the red electron gun 20 and the preset tapping point of a potentiometer 25, the junction between the resistor 24 and the potentiometer 25 being grounded with respect to alternating currents via a capacitor 26 and the ends of the potentiometer 25 being respectively connected to ground and a terminal 27 maintained at a suitable potential positive with respect to ground. A positive bias potential is also applied to the control grid of the green electron gun 21 by means of a similar network comprising a resistor 28, a potentiometer 29 and a capacitor 30, the ends of the potentiometer 29 being respectively connected to ground and the terminal 27. A bias potential is also applied to the control grid of the blue electron gun 22 by means of a similar network comprising a resistor 31, a potentiometer 32 and a capacitor 33, the ends of the potentiometer 32 being respectively connected to a terminal 34 maintained at a potential suitably negative with respect to ground and via a variable preset resistor 35 to the terminal 27. The ends of the resistor 35 are respectively connected to a pair of make contacts 36 of a magnetic relay 37. Relay 37 will be referred to in more detail below.

Separate bias potentials, positive with respect to ground but of larger magnitude than those applied to the control grids of the electron guns 20, 21 and 22 are similarly applied to the screen grids of the electron guns 20, 21 and 22 via the respective preset tapping points of three potentiometers 38, 39 and 40. The tapping points of these potentiometers 38, 39 and 40 are grounded with respect to alternating current via capacitors 41, 42 and 43, respectively, the ends of each of the potentiometers 38 and 39 being respectively connected to ground and a terminal 44, maintained at a suitable potential positive with respect to ground. The ends of the potentiometer 40 are respectively connected to the terminal 44 and via a potentiometer 45 to ground. The preset tapping point of the potentiometer 45 is connected to one of a second pair of make contacts 46 of the relay 37, the other one of the contacts 46 being connected to ground.

The color-television receiver further includes means 90 for detecting changes in the ambient light falling on the image reproducing device. Means 90 may include a pair of PNP photo-transistors 50 and 51. Though not shown in the drawing, photo-transistors 50 and 51 are mounted adjacent the screen of the image reproducing device 19 so as to be subjected to substantially the same illumination from ambient sources as the screen of the image reproducing device 19 while at the same time being screened substantially from light radiated from the screen of the image reproducing device. Photo-transistor 50 is fitted with a red filter 62 and hence responds only to red light and photo-transistor 51 is fitted with a blue filter 63 and hence responds only to blue light.

The color-television receiver finally includes means 100 responsive to the detection means 90 for changing the reproduced image in accordance with changes in the ambient light to compensate for such changes. In particular, means 100 change the bias potentials applied to the image reproducing device 19 from the bias networks 70 and 80. Means 100 may include the aforementioned relay 37 having its operating coil connected in parallel with a rectifier 47. This parallel combination is connected between the collector of a PNP junction transistor 48 and a terminal 49 maintained at a suitable potential negative with respect to ground. The emitter of transistor 48 is connected to the collector of photo-transistor 50 and the base of transistor 48 is connected to the collector of photo-transistor 51. The photo-transistors 50 and 51 are otherwise connected in identical circuit arrangements, the collectors being respectively connected to the terminal 49 via resistors 52 and 53 of equal value, the emitters respectively connected to ground via resistors 54 and 55 of equal value and the bases being respectively connected via resistors 56 and 57 of equal value to the junctions between identical pairs of resistors 58, 59 and 60, 61 each of which pairs is connected in series between ground and the terminal 49. The resistors 59 and 61 are variable in value. Relay contacts 36 and 46 are actually a part of means 100 but are shown in the bias networks 70 and 80, respectively, so as to simplify the drawing.

The position of the preset tapping points of the potentiometers 25, 29, 32, 38, 39 and 40 are adjusted so that in operation of the receiver with the contacts 36 and 46 open, the colors in the reproduced image are colorimetrically correct and accurate grey-scale tracking is achieved. The position of the preset tapping of the potentiometer 45 and the value of the preset resistor 35 are adjusted so that when the contacts 36 and 46 are closed, the bias potentials applied to the control grid and the screen grid of the blue electron gun 22 are changed by an amount such that, without seriously affecting the grey-scale tracking of the receiver, the quantity of the blue light in the colors of the reproduced image is slightly reduced. The reproduced image is thus slightly tinted yellow when the contacts 36 and 46 are closed.

In operation of the receiver the collector current of the photo-transistor 50 varies with and in the same sense as the quantity of red light in the ambient light falling on the screen of the image reproducing device 19 and the collector current of the photo-transistor 51 varies with and in the same sense as the quantity of blue light in the ambient light falling on the screen of the image reproducing device 19. Hence, the emitter—base bias of the transistor 48 and, therefore, the current flowing through the operating coil of the relay 37 varies with the quantity of the ambient light falling on the screen of the image reproducing device 19 and more particularly with the ratio of the quantity of red light to the chromaticity of blue light in the ambient light falling on the screen. The values of the resistors 59 and 61 are adjusted so that the operation of the relay 37 and hence closure of the contacts 36 and 46 occur when the above-mentioned ratio exceeds a predetermined value. Thus, the reproduced image becomes tinted yellow when the ratio exceeds the predetermined value, the purpose of this being to compensate for the change in the subjective impression which the viewer receives of the reproduced image when the proportion of the blue light in the ambient light falling on the screen of the image reproducing device 19 decreases. The predetermined value may, for example, be chosen so that the receiver produces an image which is colorimetrically correct when daylight is falling on the screen of the image reproducing device 19, the image changing automatically to a yellow tinted one when the light falling on the screen changes from daylight to that derived from a tungsten filament lamp.

The drop-out current of the relay 37 may suitably be arranged to be appreciably lower than the current at which the relay 37 is operated in order to prevent frequent changes from a yellow tinted to a colorimetrically correct image and vice versa during transitional periods.

The purpose of the rectifier 47 is to prevent the potential at the collector of the transistor 48 from becoming appreciably more negative than the potential at the terminal 49 with consequent destruction of the transistor 48. This might occur in the absence of the rectifier 47 due to the reactive effect of the operating coil of the relay 37.

It will be realized that any suitable arrangement for deriving a control signal whose magnitude varies with the chromaticity of the ambient light falling on the screen of the image reproducing device 19 may be used in place of the photo-transistor arrangement described above. Such alternative arrangements may, for example, employ light sensitive elements such as photo-emissive cells, selenium cells or cadmium sulphide cells.

In further arrangements in accordance with the invention, the hue of the tinting applied to the reproduced image may be made other than yellow, for example, by arranging for the magnitude of bias potentials applied to suitable electrodes of other electron guns to be varied in accordance with the chromaticity of the ambient light falling on the screen of the image reproducing device. Furthermore, the purity and/or the luminance of the reproduced image may be varied instead of, or in addition to, the hue.

In still further arrangements in accordance with the invention the overall chromaticity and/or luminance of the reproduced picture may be arranged to vary continuously with variation of the chromaticity of the ambient light falling on the screen of the image reproducing device.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A color-television receiver having apparatus to compensate for changes in the ambient light which affect the subjective impression a viewer has of the reproduced image, comprising: an image reproducing device; means for developing a luminance signal and a chrominance signal from a received composite color-television signal and for supplying said signals to said image reproducing device; means for detecting changes in the ambient light falling on said image reproducing device; and means responsive to said detection means for changing a color characteristic of the reproduced image in accordance with the changes in the ambient light to compensate for such changes.

2. A color-television receiver having apparatus to compensate for changes in chromaticity of the ambient light which affect the subjective impression a viewer has of the reproduced image, comprising: an image reproducing device; means for developing a luminance signal and a chrominance signal from a received composite color-television signal and for supplying said signals to said image reproducing device; means for detecting changes in chromaticity of the ambient light falling on said image reproducing device; and means responsive to said detection means for changing the chromaticity of the reproduced image in accordance with the changes in chromaticity of the ambient light to compensate for such changes.

3. A color-television receiver having apparatus to compensate for changes in chromaticity of the ambient light which affect the subjective impression a viewer has of the reproduced image, comprising: an image reproducing device; means for developing a luminance signal and a chrominance signal from a received composite color-television signal and for supplying said signals to said image reproducing device; means for biasing said image reproducing device to develop a reproduced image of desired chromaticity and luminance; means for detecting changes in chromaticity of the ambient light falling on said image reproducing device; and means responsive to said detection means for changing the bias on said image reproducing device to change the chromaticity of the reproduced image in accordance with the changes in chromaticity of the ambient light to compensate for such ambient light changes.

4. A color-television receiver having apparatus for changing the chromaticity of the reproduced image for changes in chromaticity of ambient light comprising: an image reproducing device; means for developing a luminance signal and a chrominance signal from a received composite color-television signal and for supplying said signals to said image reproducing device; means for biasing said image reproducing device to develop a reproduced image of desired chromaticity and luminance; means for detecting changes in the ambient light falling on said image reproducing device; and means responsive to said detection means for changing the bias on said image reproducing device to compensate for changes in chromaticity of the ambient light falling on said image reproducing device.

5. A color-television receiver having apparatus to compensate for changes in chromaticity of the ambient light which affect the subjective impression a viewer has of the reproduced image, comprising: an image reproducing device having three cathodes, three control electrodes and three screen electrodes; means for developing a luminance signal and three color difference signals from a received composite color-television signal and for supplying said luminance signal to said cathodes and said color difference signals individually to said control electrodes of said image reproducing device; means for applying bias potentials to said control and screen electrodes of said image reproducing device to develop a reproduced image of desired chromaticity and luminance; means for detecting changes in chromaticity of the ambient light falling on said image reproducing device; and means responsive to said detection means for changing the bias potentials applied to said image reproducing device in accordance with the changes in chromaticity of the ambient light to compensate for such changes.

References Cited by the Examiner

UNITED STATES PATENTS 3,027,421 3/62 Heijligers ---------- 178—7.5

DAVID G. REDINBAUGH, *Primary Examiner.*

ROBERT SEGAL, *Examiner.*